United States Patent [19]

Sunter et al.

[11] Patent Number: 6,076,337
[45] Date of Patent: Jun. 20, 2000

[54] METHOD OF CONNECTING STRIP-LIKE FILM AND CONNECTING DEVICE THEREOF

[75] Inventors: Adrian Meredith Sunter; Robert Bennett, both of Birmingham, United Kingdom

[73] Assignee: Ishida Co., Ltd., Kyoto, Japan

[21] Appl. No.: 08/995,943

[22] Filed: Dec. 22, 1997

[30] Foreign Application Priority Data

Dec. 23, 1996 [GB] United Kingdom ............... 9626769

[51] Int. Cl.[7] ............................... B65B 9/06; B31F 5/00
[52] U.S. Cl. ........................ 53/552; 53/389.3; 156/159; 156/304.6
[58] Field of Search .................. 53/389.2, 389.3, 53/551, 552, 550; 83/282; 156/157, 159, 304.6, 505, 506, 509

[56] References Cited

U.S. PATENT DOCUMENTS

| | | |
|---|---|---|
| 3,510,625 | 5/1970 | Wheeler et al. . |
| 4,110,824 | 8/1978 | Halsey et al. . |
| 4,744,845 | 5/1988 | Posey . |
| 4,995,936 | 2/1991 | Cohn . |

FOREIGN PATENT DOCUMENTS

| | | |
|---|---|---|
| 0222562 A2 | 10/1986 | European Pat. Off. . |
| 0 283 086 | 9/1988 | European Pat. Off. . |
| 1 499 045 | 10/1969 | Germany . |
| 2 729 751 | 1/1979 | Germany . |
| 1-139455 | 5/1989 | Japan . |
| 2189226 | 4/1986 | United Kingdom . |
| 2276369 | 3/1994 | United Kingdom . |

*Primary Examiner*—Peter Vo
*Assistant Examiner*—Matthew Luby
*Attorney, Agent, or Firm*—Staas & Halsey LLP

[57] ABSTRACT

To easily position and bond together a preceding strip-like film and a succeeding strip-like film and with improved operational performance, pairs of front and rear clamp members (27, 32, 28, 33) are arranged on a running path 10 of a strip-like film (F). A preceding film (F1) clamped by these clamp members is cut by a cutter (49). The rear clamp only is then released, and a portion of the preceding film (F1) backward from a cut position (C) is removed. A succeeding film (F2) is moved forwardly until the succeeding film (F2) comes in contact with the front clamp member (32) whereby the succeeding film (F2) can be positioned with respect to the preceding film (F1). The succeeding film (F2) is clamped again by the rear clamp, electricity is conducted to a heater (45) under this state whereby overlapped portions of the two films (F1, F2) are bonded. Thereafter the two clamps are released and the running of the bonded film is restarted.

15 Claims, 8 Drawing Sheets

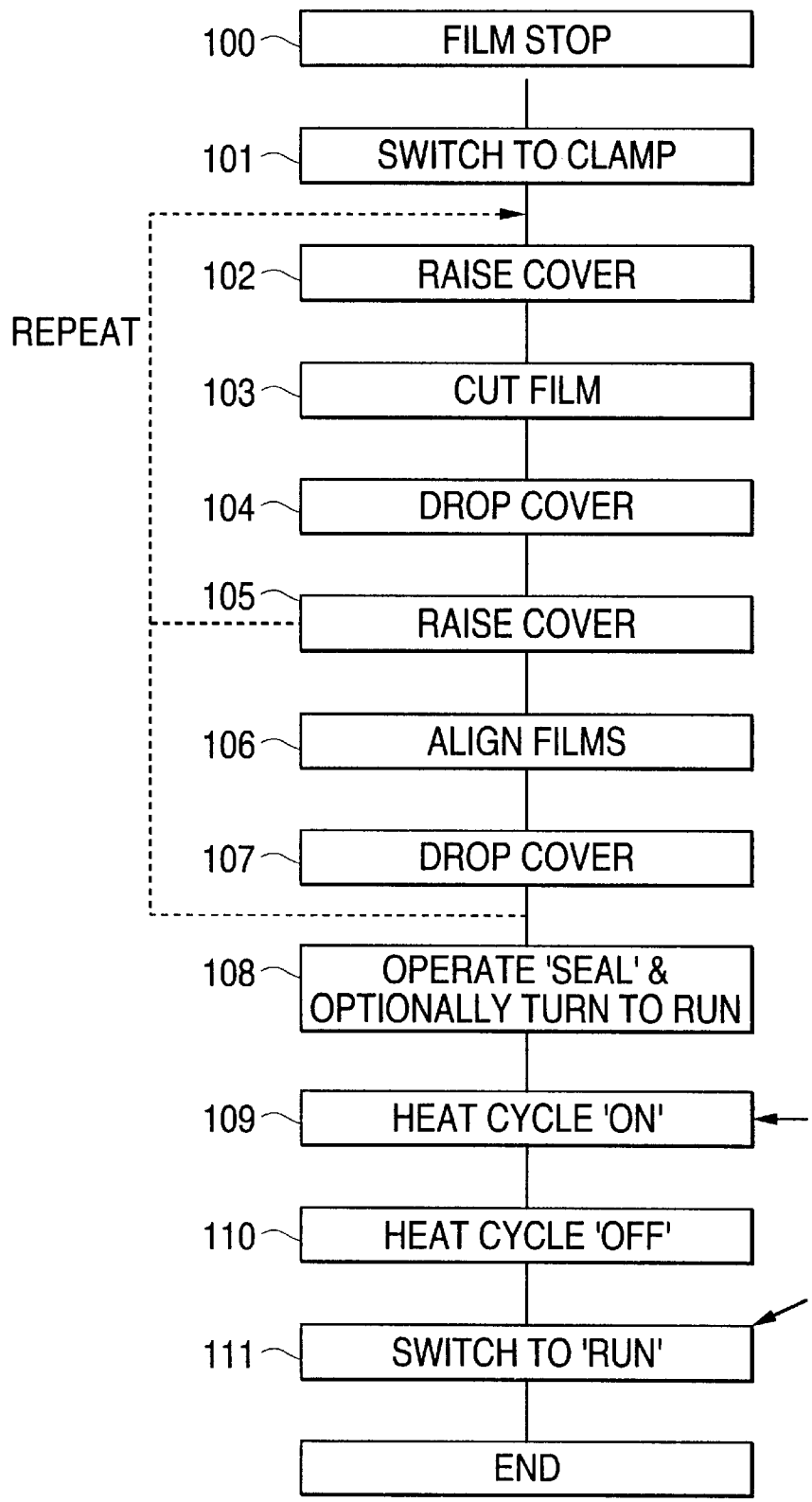

METHOD OF CONNECTING STRIP-LIKE FILM AND CONNECTING DEVICE THEREOF

CROSS REFERENCE TO RELATED APPLICATIONS

This application is based upon and claims priority from British Patent Application No. 9626769.5 filed on Dec. 23, 1996, the contents of which are incorporated herein by reference.

BACKGROUND OF THE INVENTION

1. Field of the Invention

The present invention relates to a method of connecting a strip-like film and a connecting device thereof capable of being used in a form-fill-seal packaging machine enclosing commodities in packaging bags while form-fill-sealing a strip-like film into the packaging bags, or the like.

2. Description of the Related Art

As disclosed in, for example, Japanese Unexamined Patent Publication No. 1362/1991, there is known a form-fill-seal packaging machine in which a strip-like film is unreeled from a roll. The film is curved into a cylindrical shape at a downstream end portion of a running path while running the film along the running path. Mutually overlapped side edge portions and bottom end portions of the cylindrical film are respectively welded and sealed. Thereafter, commodities are supplied. Finally top end portions of the cylindrical film are welded, sealed and separated by cutting whereby the packaging bags enclosed with commodities are successively formed.

In such a form-fill-seal packaging machine, when the current film is exhausted, or the current film is interchanged with a film having a different design in accordance with the change of the enclosed commodities etc., or the like, the strip-like film or the film roll is interchanged. A number of members and devices including guide rollers, a forming unit curving the film into a cylindrical shape are installed along the feed path of the film, and the downstream end portion of the feed path where the bag forming packaging operation is carried out. Accordingly, it is very complicated and unpreferable to insert a new film along the feed path again after the running of the preceding film has been finished. Hence, it is known to bond the new or succeeding film to the preceding film at a position immediately after the film is unreeled out from the film roll and is made to run successively on the feed path under this state.

General technologies for connecting the succeeding new strip-like film to the preceding old strip-like film and manually switching or interchanging the strip-like film in this way are disclosed in, for example, Japanese Unexamined Patent Publication No. 59551/1992 and Japanese Unexamined Patent Publication No. 97122/1993.

However, all of the conventional technologies include a drawback in operational performance. Although in such a connecting operation, it is important for preventing wasteful use of the films and realizing stable connection of the films to minimize and always maintain as constant the overlap margin of the films, no conventional technologies satisfying such a request has yet been found.

Also, particularly in the case where limp or flexible films are connected manually, it is difficult to position the films in which the succeeding film is maintained in parallel with the preceding film. These films are made to overlap by a predetermined amount while the two side edge portions are being aligned. No proposal for technology capable of performing such an operation easily in a short period of time has currently been found.

SUMMARY OF THE INVENTION

Thus, it is a problem confronted by the present inventor to provide a method of connecting a strip-like film and a connecting device therefor excellent in operational performance. The device must easily position the films even with limp or flexible films and be capable of connecting the preceding film to the succeeding film stably and always with a constant overlap margin.

In order to resolve the above-mentioned problem the present invention includes, according to a first embodiment of the present invention, a method for connecting a succeeding strip-like film to a preceding strip-like film, the method comprising transversely clamping the preceding strip-like film with at least a front clamp member, transversely cutting the preceding film at a position rearward of the front clamp member, removing the portion of the preceding film rearward, with respect to the feed direction, from the cut position, bringing a front end portion of the succeeding strip-like film under a rear clamp member in its opened state whereby the front end portion of the succeeding film overlaps a rear end portion of the preceding film, clamping the succeeding film in its overlapped state using the rear clamp member, bonding the overlapped portions of the two films, and releasing the front and the rear clamp members.

When the succeeding film is connected to the preceding film, first, the preceding film is clamped at a forward position, and also, optionally, at a backward position with respect to the feed direction. Thereafter, the film is cut in the transverse direction at a predetermined position behind the front clamp member. The portion of the film backward from the cut position is removed, if necessary after releasing the rear clamp member. Accordingly, not only in the case where the preceding film in a roll has been exhausted, but in the case where it is in the midst of being used, the rear end portion of the preceding film to which the succeeding film is to be connected is formed by cutting the preceding film at the predetermined position whereby the film can be interchanged by connecting the succeeding film to the rear end portion of the preceding film.

Next, the front end portion of the succeeding film is moved forward in the feed direction to overlap the rear end portion of the preceding film. This can be assisted by providing a registration edge, such as a rear portion of the front clamp member in its clamped state, against which the front end portion of the succeeding film is brought into contact whereby the forward movement is restrained. Thereby, the succeeding film is brought into a state where it is positioned by the rear portion of the front clamp member. The front end portion of the succeeding film overlaps the rear end portion of the preceding film which remains protruding backward from the front clamp member by a predetermined length through the cutting operation, over a range of the predetermined length. In that case, the cutting is carried out such that the rear end portion of the preceding film remains protruding backward from the front clamp member by the length corresponding to the overlap margin of the two films. Accordingly, the preceding film and the succeeding film always overlap with certainty over the length of the constant overlap margin. That is, a length between the rear portion of the front clamp member and the cutting position acts as the overlap margin. Typically, the cutting operation will be carried out at a position rearward of the rear clamp member.

Further, the succeeding film is positioned and therefore, even with a limp film, the succeeding film can readily be maintained in parallel with the preceding film. Further, the side edge portions of both films can simply be aligned by moving the succeeding film in the transverse direction under the positioned state.

Conveniently, a cover member covers a portion of the feed path of the strip-like film including the front and the rear clamp members. The cover member is closed during normal running of the strip-like film. When the cover member is opened at least the front clamp member clamps the preceding film.

Thus, the cover member is closed during normal running of the strip-like film and therefore, the safety of an operator is secured. On opening the cover member, the preceding film is first clamped in cooperation with the opening operation and then, the promotion of the operational performance and the prevention of erroneous operation can be achieved.

According to a second embodiment of the present invention, there is provided a connecting device for connecting a succeeding strip-like film to a preceding strip-like film, the device including a front and a rear clamp member disposed at a predetermined interval along a feed path of a strip-like film for respectively clamping the strip-like film in a transverse direction, a cutting unit disposed to cut the preceding strip-like film in a transverse direction rearward of the front clamp member, a clamp opening and closing unit for respectively opening and closing the front and the rear clamp members whereby the front clamp member can be closed and the rear clamp member opened to enable the front end portion of the succeeding film to be brought under the rear clamp member to overlap the preceding film, and, a bonding unit disposed between the front and the rear clamp members for bonding overlapped portions of the preceding and the succeeding films.

Preferably, the bonding unit is arranged in the proximity of the front clamp member, and is constituted such that when the rear clamp member clamps the film, the bonding unit press-contacts the film in cooperation with the clamp operation.

Thus, the front end portion of the succeeding film is bonded to the rear end portion of the preceding film under the state where the front end portion of the succeeding film is being pressed down and therefore, there is no wrinkling or bending-back at the bonded portion whereby the catching of the running film is avoided, the connected film can run smoothly. Even in the case where a packaging bag is formed from a portion thereof contiguous to the bonded portion, a bag free of defects can be formed.

Preferably, the clamp opening and closing unit comprises an urging unit to urge the front clamp member into a closed state, a driving unit to open and close the rear clamp member in the closed state or in two stages of narrowly and widely opened states, respectively, and a connecting unit to connect the front and the rear clamp members such that when the rear clamp member is brought into the closed state or the narrowly opened state by the driving unit, the front clamp member is brought into the closed state by the urging unit and when the rear clamp member is brought into the widely opened state, the front clamp member is brought into the opened state against the urging unit in accordance with the opening operation.

In this case, three clamp states are necessary for the connecting operation are realized. The clamp states are first, a state where the rear clamp member is closed and the front clamp member is closed, second, a state where the rear clamp member is opened and the front clamp member is closed, and third, a state where the rear clamp member is opened and the front clamp member is opened.

Typically, the connecting device further comprises a cover member covering a portion of the feed path of the strip-like film including the front and the rear clamp members, and the driving unit opening and closing the rear clamp member in cooperation with opening and closing of the cover member.

BRIEF DESCRIPTION OF THE DRAWINGS

Further embodiments and examples of the present invention as well as methods of operation and construction will become apparent to one skilled in the art from study of the following detailed description and the appended drawings, all of which form a part of this application. In the drawings:

FIG. 9 is a flow diagram of the film connecting operation in accordance with the film connecting device.

DETAILED DESCRIPTION OF THE PRESENTLY PREFERRED EMBODIMENTS

An explanation is now provided of embodiments of the present invention with reference to the accompanying drawings.

Figure 1:
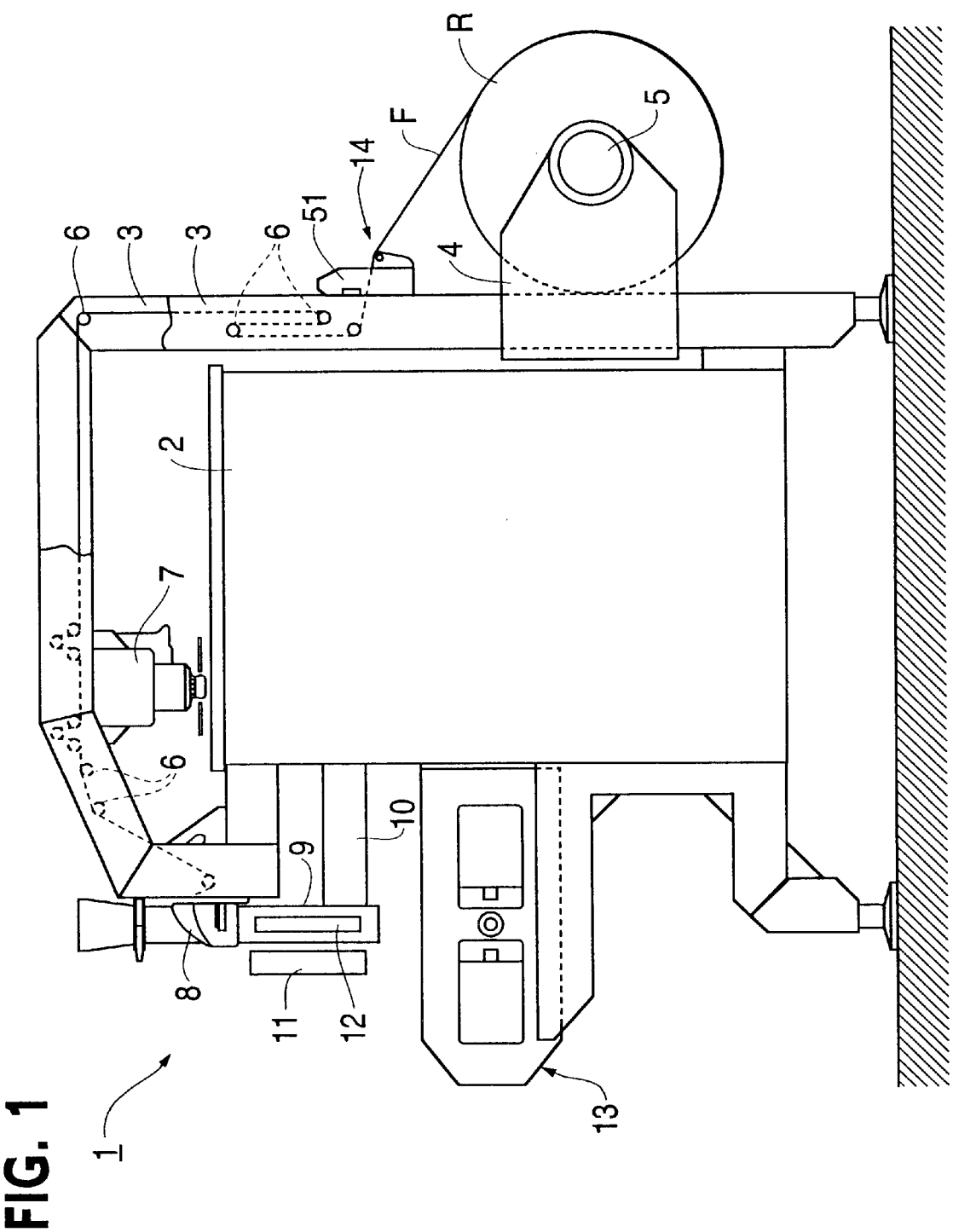
FIG. 1 is an outline side view showing the total constitution of a form-fill-seal packaging machine in which a film connecting device in accordance with the present invention is mounted.
Figure 2:
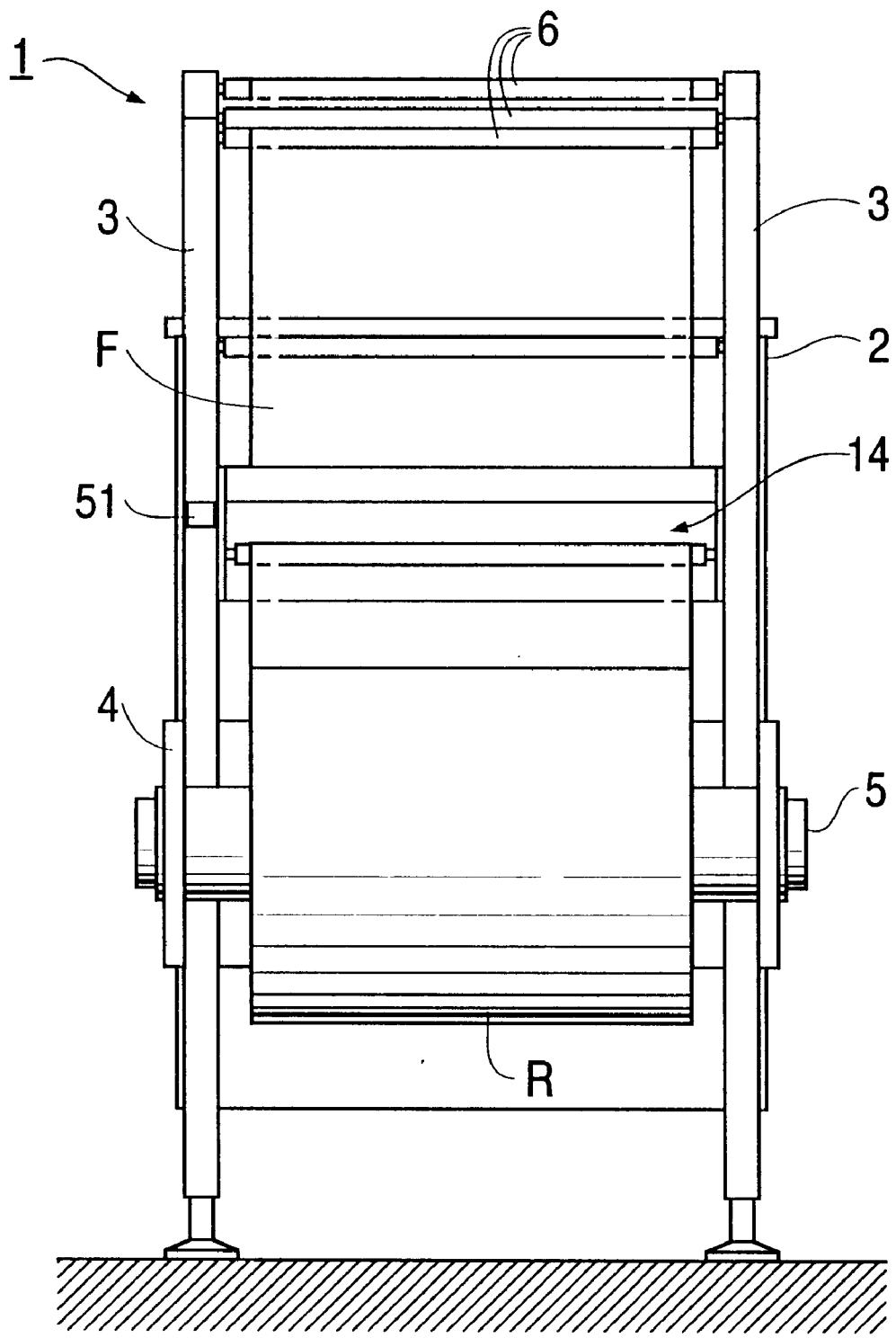
FIG. 2 is an outline back view of the same.

FIG. 1 is an outline side view of a form-fill-seal packaging machine 1 in which an example of a connecting device 14 for a strip-like film in accordance with the present invention is mounted and FIG. 2 is an outline back view thereof. At first, a simple explanation will be given of the total constitution of the form-fill-seal packaging machine 1 and the flow of a film F in reference to these drawings. The form-fill-seal packaging machine 1 is provided with a pair of left and right frames 3 extending from a back side of a main body 2 to an upper side thereof and finally to a front side thereof. The strip-like film F unreeled from an optionally motor driven film roll R rotatably supported at the rear portions of the frames 3 via support brackets 4 and a shaft 5, first passes through the connecting device 14 and is transferred to the front side of the main body 2 along the frames 3 while being guided by a plurality of rollers 6 provided to span between the frames 3. In the case where the film F is printed with a manufacturing date etc., in the midst of transfer, a printing device 7 installed at the upper portions of the frames 3 prints on film F. A forming unit 8 and a cylindrical chute 9 for inputting commodities, the chute being arranged to extend in the vertical direction, are provided at the front side of the main body 2. The strip-like film F which has been transferred along the above-mentioned frames 3 is curved into a cylindrical shape by being wrapped on the peripheral face of the chute 9 by the forming unit 8. At that time both side edge portions of the film F are made to overlap each other on the peripheral face of the chute 9 and the film F is transferred further in the downward direction along the chute 9 under the overlapped state. Further, a vertical sealing device 11 is arranged at the front side of the cylindrical chute 9 via an L-shaped support arm 10 extended to the front side from the main body 2 to surround the chute 9. Opposite to the chute 9, the two side edge portions of the film F which have been overlapped on the peripheral face of the chute 9, are press-contacted to the side of the chute 9 by the vertical sealing device 11 and heated and bonded under this state. Transfer belts 12 (only one of them is illustrated in FIG. 1) for transferring the cylindrical film in the downward direction (for example while adsorbing it under vacuum, or via frictional contact), are installed at both sides of the cylindrical chute 9. Although longitudinal lap sealing of the side edge portions is described, other types of seals such as fin and pinch seals are possible with suitably designed forming units 8.

A transverse sealing device 13 for sealing, in the transverse direction, the cylindrical film which has been transferred downwardly from the chute 9, is arranged below the cylindrical chute 9. The device 13 incorporates a cutter device for cutting off a preceding portion of the cylindrical film from a succeeding portion thereof at a center position of the sealed portion. Further, following transverse sealing of the cylindrical film by the transverse sealing device 13, commodities are input from the cylindrical chute 9 and the transverse sealing and cutting are carried out while the cylindrical film is being transferred in the downward direction. Thereafter, the packaging bags are discharged.

Figure 3:
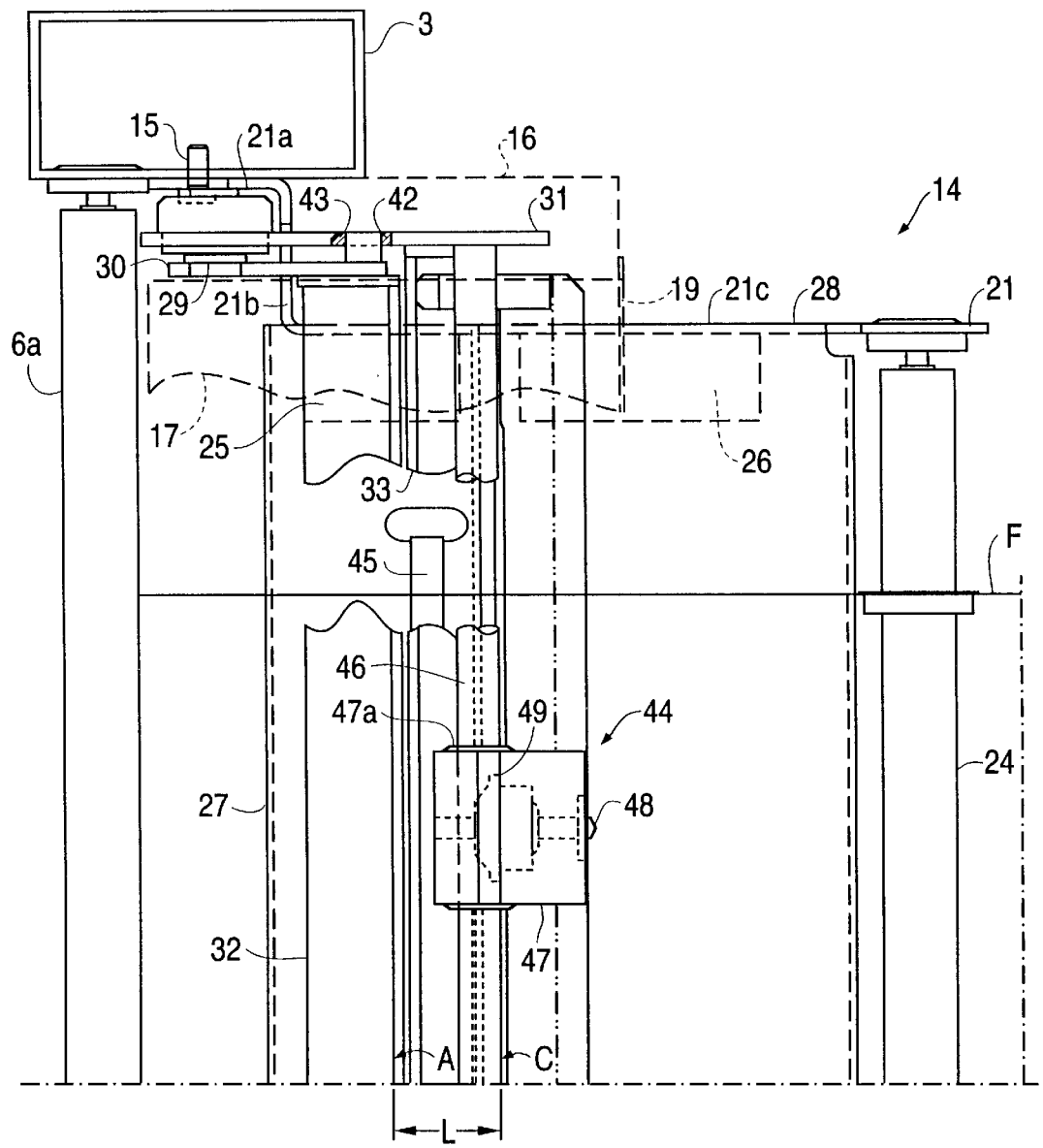
FIG. 3 is a plane view enlarging essential portions of the film connecting device.

Next, a detailed explanation will be given of a connecting device 14 of the strip-like film F. The connecting device (hereinafter "splicer") 14 is provided above the support brackets 4 at the rear portions of the frames 3. The strip-like film F unreeled from the film roll R first passes through the splicer 14. The splicer 14 is provided with a structure substantially symmetrical with respect to left and right sides thereof. An enlarged plane view thereof in the proximity on the side of one of the frames 3 is illustrated in FIG. 3 and vertical sectional views thereof under different operational states, described later, are respectively illustrated in FIG. 4 through FIG. 6. Incidentally, in line with the front and rear of the form-fill-seal packaging machine 1, the left side of the drawing is in the forward direction and the right side thereof is in the rearward direction.

The splicer 14 is provided with two end covers 16 attached respectively to side plates 21, which are attached to the frames 3 by bolts 15. A roof member 17 is provided to span and connect the end covers 16. The pair of left and right end covers 16 and the roof member 17 constitute a casing 18 of the splicer 14. A cover 19 of the splicer 14 is installed at, and extends between, the rear edge portions of the rear expanded portions of the end covers 16 via hinges 20 and is pivotable between an opened state shown in FIG. 4 or FIG. 5 and a closed state shown in FIG. 6.

Each of the side plates 21 is provided with an attaching face 21a to which the bolts 15 are fastened, an intermediate face 21b extending from the attaching face 21a toward the inner direction between the frames 3 and a support face 21c extended from the intermediate face 21b to expand toward the rear side of the frames 3. An introducing roller 24 introducing the strip-like film F unreeled from the film roll R to the inside of the splicer 14, is rotatably mounted to span between the upper rear end portions of the support faces 21c.

Further, front and rear portions of the upper portion of each of the support faces 21c are bent toward the inner direction between the frames 3 to form front flanges 25 and rear flanges 26, respectively. Also, a front plate 27 having a channel-like sectional shape and a rear plate 28 having an L-like sectional shape are provided to span respectively between the front flanges 25 and the rear flanges 26 at a predetermined interval. The strip-like film F introduced into the inside of the splicer 14 via the introducing roller 24 is made to run on the front and rear plates 27 and 28. Incidentally, the film F which has passed through the splicer 14, is introduced to the transfer path along the frames 3 via a guide roller 6a provided to span between the frames 3 at a location immediately in front of the splicer 14.

Front brackets 30 each having relatively small dimensions and rear brackets 31 each having large dimensions are respectively and rotatably supported by support shafts 29 rotatably mounted to the side plates 21. A front damper 32 and a rear damper 33 respectively having L-shaped sections are provided to span between the front brackets 30 and between the rear brackets 31. The front and rear brackets 30 and 31 are pivoted upwardly and downwardly around the support shafts 29 whereby the strip-like film F is pinched and clamped between the front damper 32 or the rear damper 33 and the front plate 27 or the rear plate 28, respectively.

Pins 34 protrude from the front brackets 30 and pins 35 similarly protrude from the support faces 21c. Tension return springs 36 are provided between the pins 34, 35 so that the brackets 30 and the front damper 32 are always urged in the downward direction. Further, pins 37 protrude from the rear brackets 31 and pins 38 similarly protrude from the support faces 21c. Actuators 41 each comprising two air cylinders 39 and 40 are rotatably mounted to the pins 37, 38 whereby the rear brackets 31 and the rear damper 33 are pivoted around the support shafts 29 by the operation of the actuators 41. Rear dampers 32 and 33 are elevated from the front and rear plates 27 and 28 by the actuator 41 against the urging force of the return springs 36 whereby the clamping of film F is released.

A cutter unit 44 cutting the strip-like film F on the front and the rear plates 27 and 28 in the transverse direction between the plates 27 and 28 and an electrically powered bonding heater 45, for welding and bonding in the transverse direction the strip-like film F by press-contacting it onto the front plate 27 and heating it, are provided between the rear brackets 31 in addition to the rear damper 33.

Figure 4:
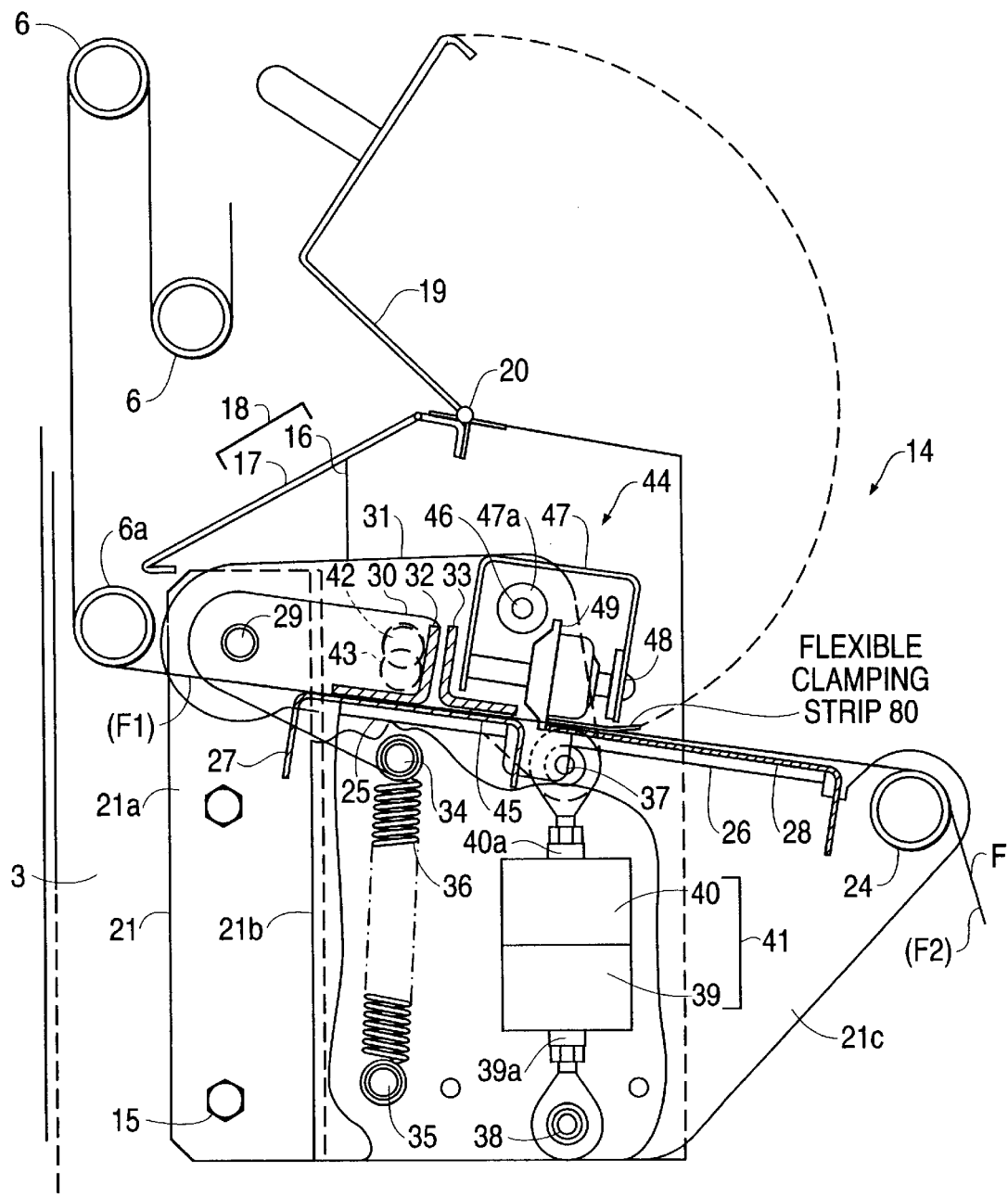
FIG. 4 is a vertical sectional view, partly cut away, showing one operational state of the film connecting device.

The cutter unit 44 is provided with a beam 46 provided to span between the rear brackets 31, a housing 47 a boss portion 47a of which is outwardly fitted to the beam 46 and which is a friction fit on but movable along the beam 46 and a disk-like cutter 49 attached to the housing 47 rotatable around a pin 48 and provided with a saw blade at its peripheral portion. A flexible clamping strip 80 is secured to part of the cutter mechanism and will clamp the film F when the cutter unit 44 is in its cutting position (FIG. 4). As shown in FIG. 4, when a forward portion and a backward portion of the strip-like film F are clamped by the front and rear clampers 32 and 33 by downwardly moving the rear brackets 31, the cutter 49 enters between the front and rear plates 27 and 28. The film will also be clamped by strip 80. When an operator abrasively moves the cutter unit 44 along the beam 46, the film F can be cut in the transverse direction at a position designated by notation C between the front and rear plates 27 and 28.

Figure 5:
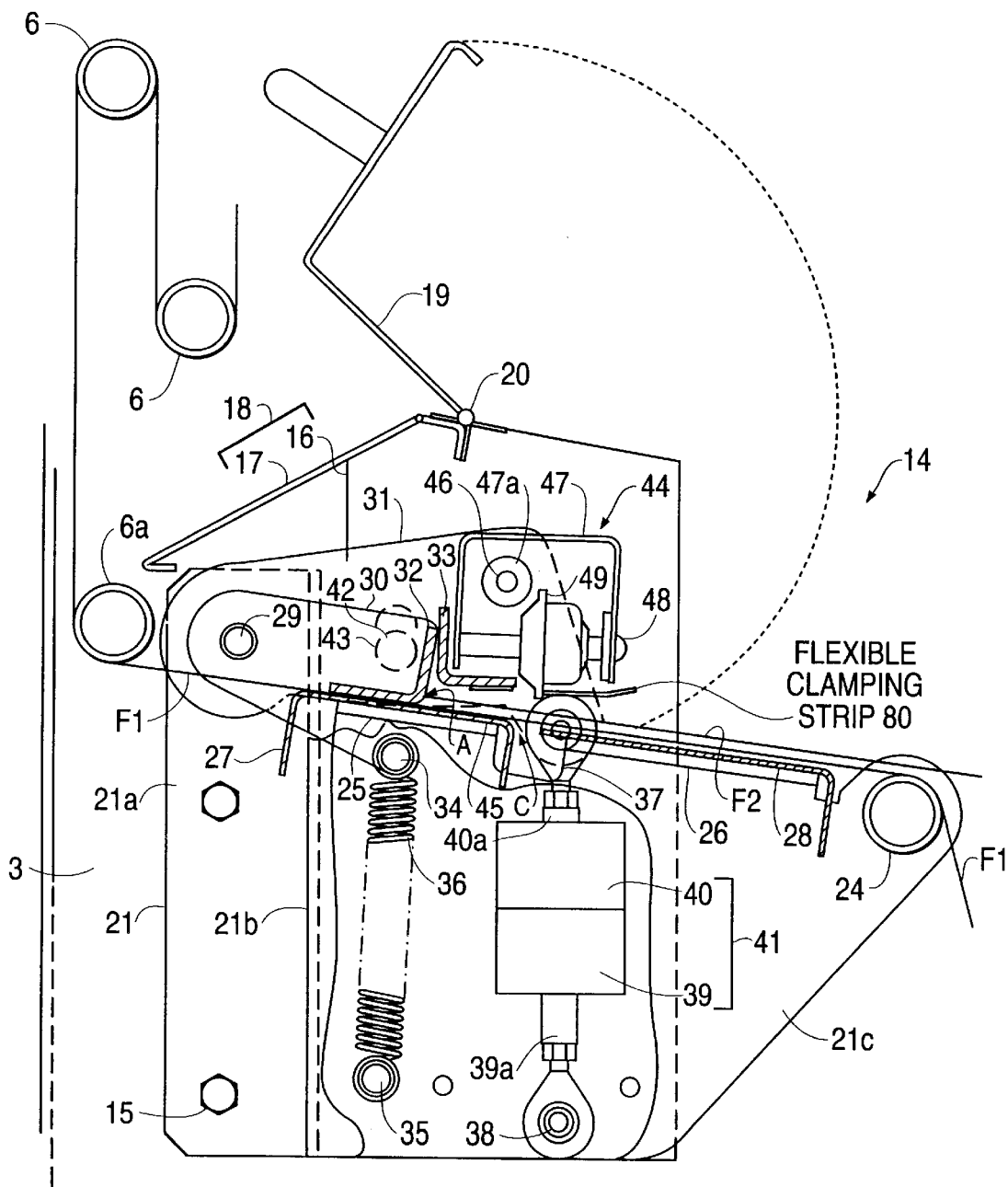
FIG. 5 is a vertical sectional view, partly cut away, showing another operational state of the film connecting device.
Figure 6:
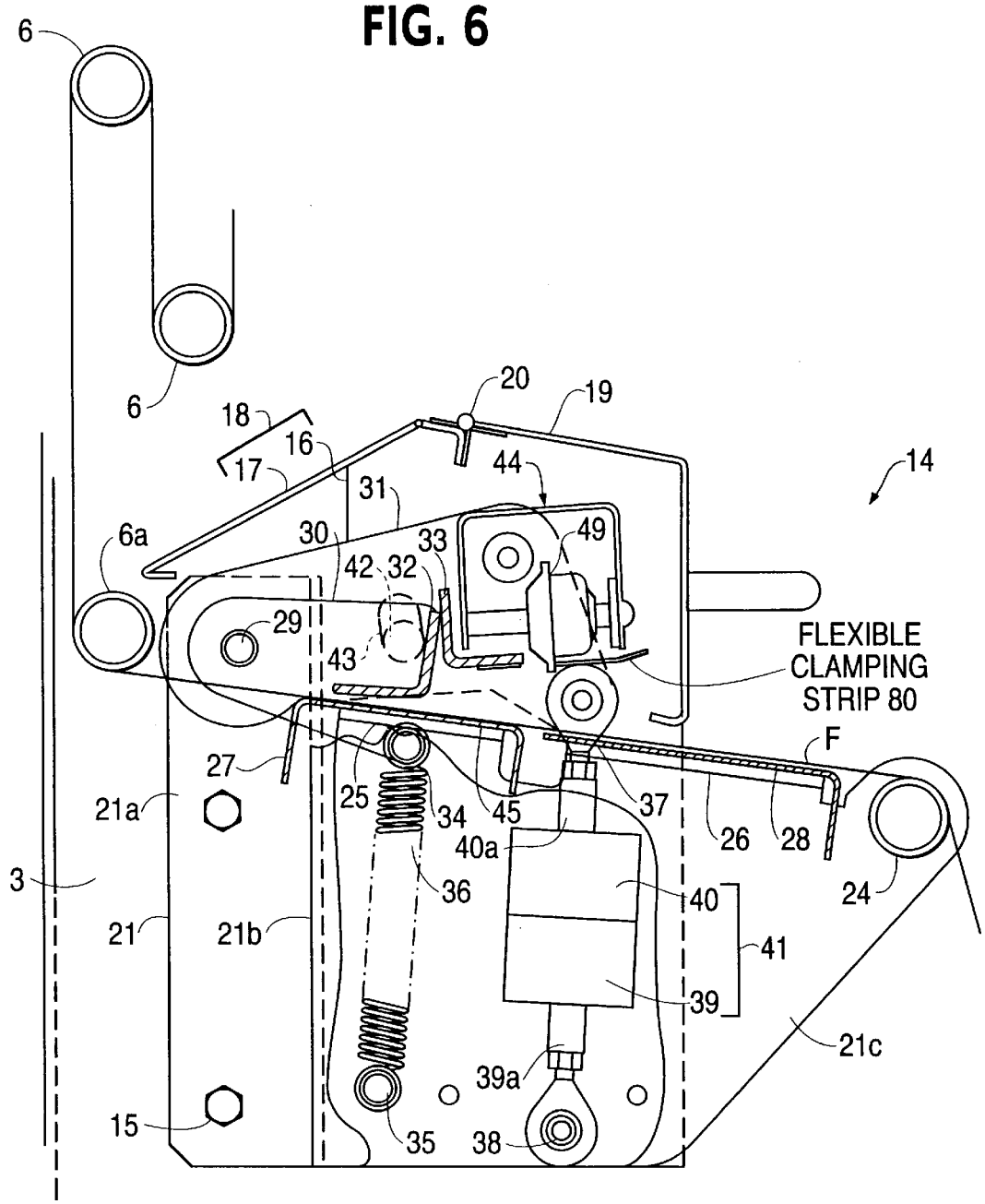
FIG. 6 is a vertical sectional view, partly cut away, showing still another operational state of the film connecting device.

When the rear clamper 33 or the front and rear dampers 32 and 33 release the clamping of the film F by elevating the rear brackets 31 as illustrated in FIG. 5 or FIG. 6, the cutter unit 44 is elevated along therewith. Thus, the cutting of the film F under this state cannot be performed.

The cutter unit 44 can be retracted to the right hand side when not needed.

The bonding heater 45 is provided to span between the rear brackets 31 at a forward position from the disk-like cutter 49 of the cutter unit 44. When the rear brackets 31 are moved downwardly and a forward portion and a backward portion of the strip-like film F are clamped by the front and rear dampers 32 and 33 as illustrated in FIG. 4, the bonding heater 45 press-contacts the strip-like film F by squeezing it between the heater and the front plate 27. The film F is heated under this state whereby it can be welded and bonded in the transverse direction. In this case the heater 45 is arranged in the proximity of the front damper 32 under the clamping state.

When the rear brackets 31 are elevated and the rear clamper 33 or the front and the rear dampers 32 and 33 release the clamping of the film F as illustrated in FIG. 5 or FIG. 6, the heater 45 is elevated along with rear brackets 31 and rear clamper 33. The bonding of the film F under this state cannot be performed.

Figure 7:
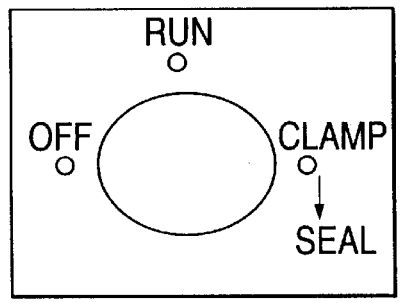
FIG. 7 is an explanatory view of an operation change switch provided to the film connecting device.
Figure 8:
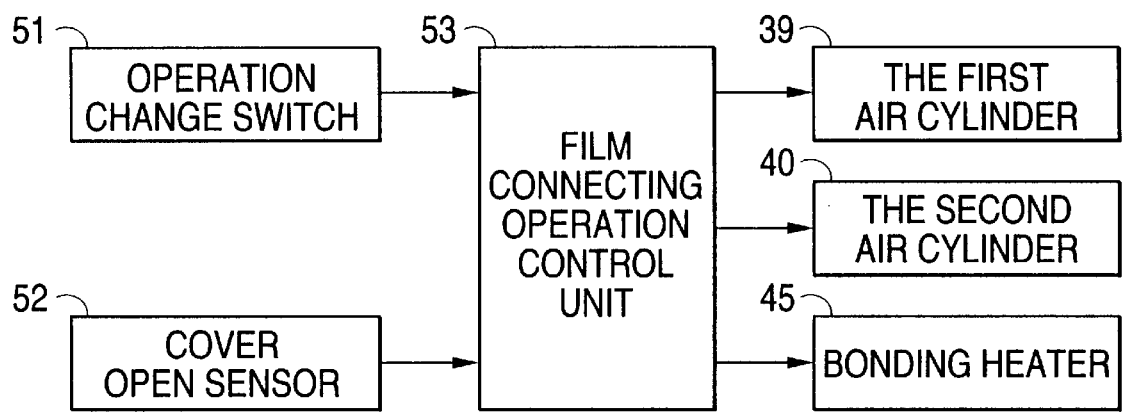
FIG. 8 is a control system diagram of the film connecting device.

An operation change switch 51 is operated by an operator in the connecting operation of the film and which is laid out, for example, as illustrated in FIG. 7, in the vicinity of the splicer 14 (refer to FIG. 1 and FIG. 2). As illustrated in FIG. 8 a cover open sensor 52 detects the opening of the splicer cover 19 and a film connecting operation control unit 53 outputs ON and OFF signals to the first air cylinder 39 and the second air cylinder 40 of the actuator 41 and the bonding heater 45 of the splicer 14 based on input signals from the switch 51 and the cover open sensor 52.

Next, an explanation will be provided of a connecting method of a strip-like film using the splicer 14 in reference to the control system diagram of FIG. 8 and a flow diagram of FIG. 9.

The strip-like film F is reeled out from the roll R and normally runs along the frames 3. In the normal run, as illustrated in FIG. 6, the splicer cover 19 is closed, both of the first and the second air cylinders 39 and 40 are turned ON, and both of the front and rear dampers 32 and 33 are released. Further, the cutter unit 44 is at its stored position laterally offset from the film, the bonding heater 45 is off, and the change switch 51 is set to RUN.

Here, when a currently used film (preceding film F1) is interchanged with a new film (succeeding film F2), the running of the preceding film F1 is stopped (step 100 in FIG. 9), which may be a controlled stop or a stop due to the approach of the end of the film. The switch 51 is changed to CLAMP and the operation control unit 53 turns OFF both of the first and the second air cylinders 39 and 40 (step 101). Thereby, as illustrated in FIG. 4, a forward portion of the preceding film F1 passing through splicer 14 is clamped by the two dampers 32 and 33.

The cover 19 is raised (step 102) and the dampers 32, 33 remain active. Next, the cutter unit 44 is abrasively moved against the friction fit in the left and right direction under this state and the film F1 is cut (step 103) in the transverse direction at the position C between the plates 27 and 28. The cutter unit 44 is then returned to its stored position and the cut portion of the film nearer the reel R is removed.

Next, the cover 19 is closed (step 104) and then raised (step 105). This causes a rear clamp release signal to be input to the operation control unit 53 which turns ON the first air cylinder 39. Thereby, only the rear clamper 33 is released under a state where only the clamping of the film by the front damper 32 is still continued as shown in FIG. 5.

Next, a front end portion of the succeeding film F2 which is unreeled from a new film roll, is made to pass through the rear damper 33 in the released state and move forwardly until the front end portion of succeeding film F2 comes in contact with the rear end portion of the front damper 32 that is still under the clamping state, as designated by notation A in FIG. 5. In this way the preceding film F1 and the succeeding film F2 overlap each other with certainty always by a length designated by L in FIG. 3. That is, the length L is a length between the rear end portion A of the front damper 30 and the cut position C. Further, the side edge portions of the two films F1 and F2 can readily be brought into alignment by moving the succeeding film F2 in the left and right direction under this state (step 106).

The cover 19 is then closed (step 107) and the operation control unit 53 turns OFF the first air cylinder 39. Thereby, the rear damper 33 moves downward again and the clamping is performed under a state where the newly introduced succeeding film F2 overlaps the preceding film F1 by the overlap margin L. Further, the overlapped portions of two both films F1 and F2 are press-contacted between the bonding heater 45 and the front plate 27 by the bonding heater 45. These steps 102–107 can be repeated if necessary.

In a step 108 the change switch 51 is moved to SEAL and the operation control unit 53 further turns ON the bonding heater 45 (step 109) whereby the heating and bonding of the overlapped portions of the two films F1 and F2 are started. When a period of time required for bonding, which has been previously established experimentally, elapses, the operation control unit 53 turns OFF the bonding heater 45 (step 110) and turns ON both of the first and the second air cylinders 39 and 40 after an interval following heating to improve bonding and allow the weld to cool and gain strength. Thereby, both of the front and rear clampers 32 and 33 are elevated again as illustrated in FIG. 6. The bonded strip-like film F is released into a runnable state. The change switch 51 is then set to RUN (step 111) and operation of the machine commences.

In an alternative method, in step 108 the switch could be immediately tuned to RUN after SEAL and so the machine would automatically restart after a predetermined bonding cycle.

According to this connecting method the two films F1 and F2 overlap each other by bringing the front end portion of the succeeding film F2 into contact with the rear end portion of the front damper 32. The clamping operation is conducted under the state where the preceding film F1 is still being clamped and accordingly, the two films F1 and F2 can be overlapped always by the same overlap length L. Further, even if the film is limp, the succeeding film F2 can readily be positioned with respect to the preceding film F1 and the side edge portions of the two films F1 and F2 can simply be brought into agreement with each other.

Furthermore, the splicer cover 19 is closed in the normal running of the film so that the safety of an operator is secured. The promotion of the operation performance and the prevention of erroneous operation can be achieved since the forward position and the backward position of preceding film F1 are clamped in cooperation with the opening operation of the cover 19.

The bonding heater 45 is arranged in the proximity of the rear end portion of the front clamper 32 under the clamping state and therefore, the front end portion of the succeeding film F2 is bonded to the rear end portion of the preceding film F1 under a pressed-down state. Thereby, wrinkling or bending-back is not caused at the bonded portion. The catching of a running film which is caused when bending-back occurs is avoided. The film after the connection can smoothly be run through the machine. Even when a packaging bag is formed from a portion of the film contiguous to the bonded portion, a packaging bag without defects can be provided.

Furthermore, the three clamping states necessary for the connecting operation, that is, releasing of the film, include clamping at the forward position and the backward position of the film and releasing only the rearward portion of the film, and are realized only by driving the rear damper 33 by the actuator 41.

As explained above, according to the present invention, even with a limp film the positioning of films is facilitated and the preceding film and the succeeding film can be connected stably, always with a constant overlap margin.

While the present invention has been described in connection with what are currently considered to be the most practical and preferred embodiments, it is to be understood that various arrangements and alternative embodiments are intended to be included within the scope of the appended claims.

What is claimed is:

1. A method of connecting a succeeding strip of film to a preceding strip of film, said films moving in a feed direction, said method comprising:

transversely clamping the preceding strip of film with at least a front clamp member;

transversely cutting the preceding strip of film at a position rearward, in the feed direction of the strips of film, of the front clamp member;

removing a portion of the preceding strip of film rearward, with respect to the feed direction, from the cut position;

bringing a front end portion of the succeeding strip of film under a rear clamp member in its opened state whereby the front end portion of the succeeding strip of film overlaps a rear end portion of the preceding strips of film and contacts a rear portion of the front clamp member in its clamped state;

clamping the succeeding strip of film in its overlapped state using the rear clamp member;

bonding the overlapped portions of the two films; and releasing the front and the rear clamp members.

2. A method of connecting a succeeding strip-like film to a preceding strip of film, said films moving in a feed direction, said method comprising:

transversely clamping the preceding strip of film with at least a front clamp member;

transversely cutting the preceding strip of film at a position rearward, in the feed direction of the strips of film, of the front clam member;

removing a portion of the preceding strip of film rearward, with respect to the feed direction, from the cut position;

bringing a front end portion of the succeeding strip of film under a rear clamp member in its opened state whereby the front end portion of the succeeding strip of film overlaps a rear end portion of the preceding strip of film;

clamping the succeeding strip of film in its overlapped state using the rear clamp member;

bonding the overlapped portions of the two films; and releasing the front and the rear clamp members, wherein a cover member covers a portion of a feed path of the preceding strip of film including the front and the rear clamp members, the succeeding strip of film is movable in the feed direction when the cover member is closed, and when the cover member is opened, at least the front clamp member clamps the preceding strip of film.

3. A method of connecting a succeeding strip of film to a preceding strip of film, according to claim 2, wherein the front end portion of the succeeding strip of film is brought into contact with a rear portion of the front clamp member in its clamped state.

4. A connecting device for connecting a succeeding strip of film to a preceding strip of film, said device comprising:

front and a rear clamp means disposed at a predetermined interval along a feed path of a the strips of film for respectively clamping the strip-like film in a transverse direction;

means for cutting the preceding strip of film in a transverse direction rearward of the front clamp means;

means for opening and closing a clamp for respectively opening and closing the front and the rear clamp means;

whereby the front clamp means is closeable and the rear clamp means is openable to enable the front end portion of the succeeding strip of film to be brought under the rear clamp means to overlap the preceding strip of film and contact a rear portion of the front clamp means in its clamped state; and means for bonding disposed between the front and the rear clamp means for bonding overlapped portions of the preceding and the succeeding strip of films.

5. A connecting device according to claim 4, wherein the bonding means is disposed proximate the front clamp means and is constituted such that when the rear clamp means clamps the strips of film, the bonding means press-contacts the film in cooperation with clamp operation.

6. A connecting device according to claim 4, wherein the means for opening and closing the clamp comprises:

means for urging the front clamp means into a closed state;

means for opening and closing the rear clamp means in the closed state or in two stages of narrowly and widely opened states respectively; and means for connecting the front and the rear clamp means such that when the rear clamp means is brought into the closed state or the narrowly opened state by a driving means, the front clamp means is brought into the closed state by the urging means; and when the rear clamp means is brought into the widely opened state, the front clamp means is brought into the opened state against the urging means in accordance with the opening operation.

7. A connecting device according to claim 4, further comprising means for covering a portion of the feed path of the strips of film including the front and the rear clamp means, and wherein the opening and closing means opens and closes the rear clamp member in cooperation with opening and closing of the covering means.

8. A connecting device according to claim 5, further comprising means for covering a portion of the feed path of the strips of film including the front and the rear clamp means, and wherein the opening and closing means opens and closes the rear clamp means in cooperation with opening and closing of the covering means.

9. A connecting device according to claim 6, further comprising means for covering a portion of the feed path of the strips of film including the front and the rear clamp members, and wherein the opening and closing means opens and closes the rear clamp member in cooperation with opening and closing of the covering means.

10. A form-fill-seal packaging machine including a connecting device according to claim 4.

11. A connecting device according to claim 9, wherein the bonding unit is disposed proximate the front clamp member and is constituted such that when the rear clamp member clamps the film, the means for bonding press-contacts the film in cooperation with clamp operation.

12. A connecting device according to claim 9, wherein the driver to open and close the first and second clamp members comprises:

an urging unit to urge the front clamp member into a closed state;

a second driver to open and close the rear clamp member in the closed state or in two stages of narrowly and widely opened states respectively; and a connector to connect the front and the rear clamp members such that when the rear clamp member is brought into the closed state or the narrowly opened state by the second driver, the front clamp member is brought into the closed state by the urging unit, and when the rear clamp member is brought into the widely opened state, the front clamp member is brought into the opened state against the urging unit in accordance with the opening operation.

13. A connecting device for connecting a preceding strip of film with a succeeding strip of film, comprising:

front and a rear clamp members disposed at a predetermined interval along a feed path of a the strips of film for respectively clamping the strip-like film in a transverse direction;

a cutter to cut the preceding strip of film in a transverse direction rearward of the front clamp member;

a driver to open and close, respectively, the front and the rear clamp members;

whereby the front clamp member is closeable and the rear clamp member is openable to enable the front end portion of the succeeding strip of film to be brought under the rear clamp member to overlap the preceding strip of film and contact a rear portion of the front clamp member in its clamped state; and a bonding unit disposed between the front and the rear clamp members to bond overlapped portions of the preceding and the succeeding strip of films.

14. A connecting device according to claim 13, further comprising a cover member to cover a portion of the feed path of the strip-like film including the front and the rear clamp members, and wherein the driver opens and closes the rear clamp member in cooperation with opening and closing of the cover member.

15. A method of connecting a succeeding strip of film to a preceding strip of film, said method comprising:

transversely clamping the preceding strip of film with at least a front clamp member;

transversely cutting the preceding strip of film at a position rearward of the front clamp member;

removing the portion of the preceding strip of film rearward, with respect to the feed direction, from the cut position;

bringing a front end portion of the succeeding strip of film under a rear clamp member in its opened state whereby the front end portion of the succeeding strip of film overlaps a rear end portion of the preceding strip of film and contacts a rear portion of the front clamp member in its clamped state;

clamping the succeeding strip of film in its overlapped state using the rear clamp member;

bonding the overlapped portions of the two films; and releasing the front and the rear clamp members wherein said method further includes the step of using a connecting device including said front and a rear clamp members disposed at a predetermined interval along a feed path of a strip of film for respectively clamping the strip of film in a transverse direction; a cutter to cut the preceding strip-like film in a transverse direction rearward of the front clamp member; a driver to open and close respectively the front and the rear clamp members, whereby the front clamp member can be closed and the rear clamp member opened to enable the front end portion of the succeeding strip of film to be brought under the rear clamp member to overlap the preceding strip of film, and a bonding unit disposed between the front and the rear clamp members to bond overlapped portions of the preceding and the succeeding strip of films.

* * * * *

UNITED STATES PATENT AND TRADEMARK OFFICE
CERTIFICATE OF CORRECTION

PATENT NO.: 6,076,337
DATED : June 20, 2000
INVENTOR(S): Adrian Meredith SUNTER, et al.

It is certified that errors appear in the above-identified patent and that said Letters Patent is hereby corrected as shown below:

On the title page:

[30]  Foreign Application Priority Data change "9626769" to --9626769.5--.

Col. 10, line 6, after "the" delete "succeeding".

Signed and Sealed this

Twenty-fourth Day of April, 2001

*Attest:*

NICHOLAS P. GODICI

*Attesting Officer*   *Acting Director of the United States Patent and Trademark Office*